W. H. WATROUS.
ADJUSTABLE BRACKET.
APPLICATION FILED SEPT. 19, 1916.
1,237,428.
Patented Aug. 21, 1917.
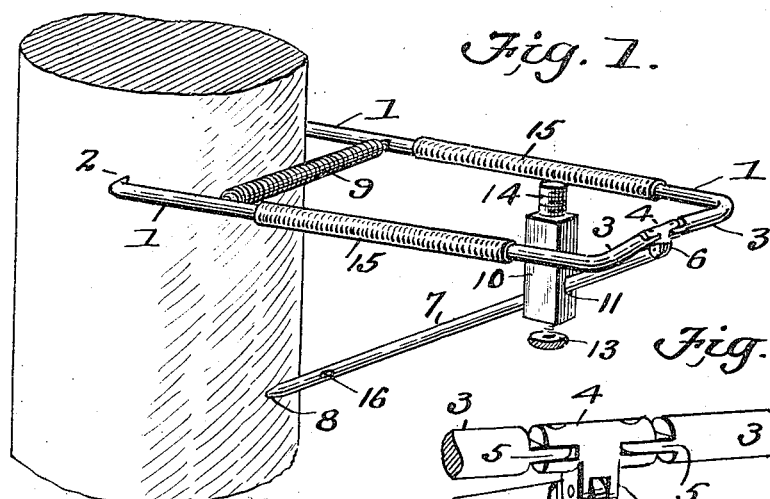
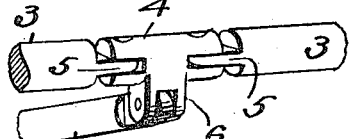
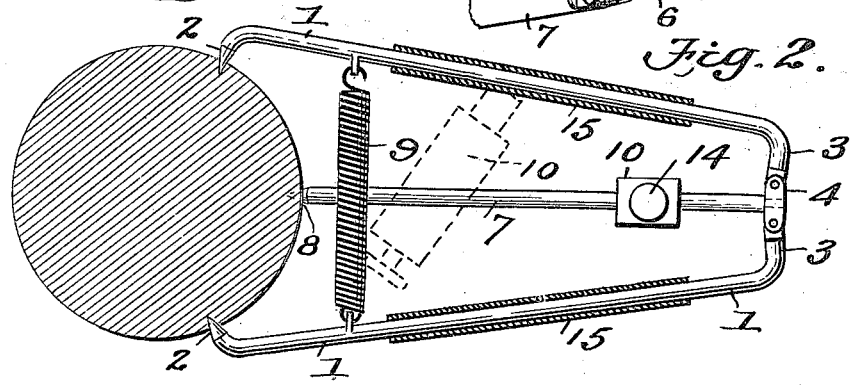
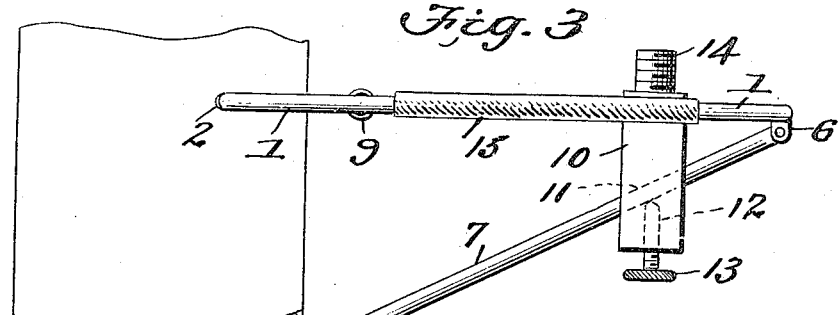
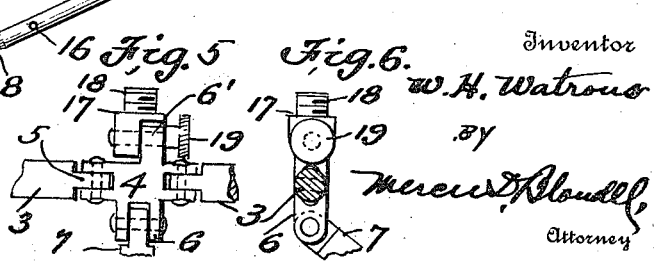
Inventor
W. H. Watrous
By
Attorney

UNITED STATES PATENT OFFICE.

WILLIAM H. WATROUS, OF BRIDGEPORT, CONNECTICUT.

ADJUSTABLE BRACKET.

1,237,428.  Specification of Letters Patent.  Patented Aug. 21, 1917.

Application filed September 19, 1916. Serial No. 120,925.

*To all whom it may concern:*

Be it known that I, WILLIAM H. WATROUS, a citizen of the United States, residing at Bridgeport, in the county of Fairfield and State of Connecticut, have invented certain new and useful Improvements in Adjustable Brackets, of which the following is a specification.

The object of the invention is to provide an adjustable bracket particularly adapted for attachment to various uprights such as poles, trees, door-frames, and window-frames, for supporting cameras, mirrors, and other objects, and which shall be so constructed that the bracket may be carried in one's pocket or grip, or in a camera case without the slightest inconvenience; the construction and arrangement being such that the bracket may not only be readily attached to, and detached from the support, but also that it is capable of such adjustments that it may be readily connected to supports of various shapes and dimensions.

The invention consists in certain novel details of constructions, combinations, and arrangements of parts as will be hereinafter fully described and then claimed.

In the accompanying drawings illustrating the invention, in the several figures of which like parts are similarly designated, Figure 1 is a perspective view of my invention shown as connected to a post or tree. Fig. 2 is a plan view of the same, the rubber sleeves carried by the supporting arms being shown in section. Fig. 3 is a side elevation of the same, and Fig. 4 is a detail of construction. Figs. 5 and 6 are detail views illustrating a slight modified detail of construction.

1 designates the supporting arms of the bracket having, what may be termed their outer ends, bent inwardly and pointed as at 2, and their opposite ends also bent inwardly as at 3, and pivotally connected to a link 4; the said link having kerfs in which are fitted the reduced ends or tongues 5 of the inwardly extending ends 3 of the arms. The link 4 is formed with a slotted extension or lug 6 in which is pivoted at one end, a supporting arm 7 having its outer or free end pointed as at 8 so as to grip into the support to which the bracket is attached, and to thus hold the arms 1 in their desired position. 9 designates a coil spring connecting the arms 1. This spring serves the purpose of drawing the arms together and to hold the pointed ends 2 firmly into engagement with the support, and hence prevent accidental slipping of the arms when an object of reasonable weight is positioned thereon. The spring is designed especially for holding the ends 2 of the arms into engagement with the support, as, for instance, when connected to a metal post, it being understood that the spring is of sufficient tensile strength to afford enough friction to hold the bracket in place.

Slidably retained upon the supporting arm 7 is a post 10, having an obliquely arranged elongated slot 11 adjacent to one end through which the supporting arm 7 passes. The lower end of the post is provided with a threaded opening 12 to receive the shank of a thumb screw 13, whereby the post may be firmly clamped at any point upon the arm 7 to which it is adjusted. The upper end of the post is formed with a threaded extension 14 to fit into the threaded opening in the body of a camera (not shown), whereby the camera may be firmly held in position upon the bracket.

In practice the arms 1 will each be covered with a rubber sleeve 15 to prevent accidental slipping of the camera when the post is not used, and also to prevent the slipping of a mirror when the bracket is employed for supporting a shaving mirror when the device is connected to a window or a door frame. I also purpose providing the supporting arm 7 with a pin 16 to prevent the post from becoming detached from the said arm 7.

As shown in Figs. 1 and 2 of the drawings, the arms 1 are spread apart against the tension of the spring 9 so that the points 2 of the ends of the arms 1 may engage the object to which the bracket is to be connected. The supporting arm is then brought up into engagement with the support and adjusted thereto until the arms 1 are adjusted either to a horizontal position or an angular position with respect to the support as will be readily understood. The bracket is then ready to receive the object it is intended to support.

When the bracket is folded, the post 10 is turned at right angles to the position shown in the drawings, so that it will fit between the arms 1 as shown in dotted lines in Fig. 2, thus making it convenient to carry the support in one's pocket, or to readily fit it in a camera case.

While I have shown and described my invention as adapted to be connected to a post or the frame of a door or window, it will be appreciated that the same may be connected to the corner of a wall, and, in fact, to any object affording a gripping surface for the points 2 of the arms.

While I have shown the supporting arm 7 provided with an adjustable post having a threaded section to receive the threaded socket in the base of the camera, I do not wish to be limited to this particular arrangement, since it is obvious that the link 4 may be formed with a vertical, perforated ear or lug 6' adapted for coöperation by a member 17 having a threaded stud 18 extending therefrom, the said member being held and firmly clamped to the ear or lug 6' by a set screw 19 as shown in Figs. 5 and 6. By this arrangement, it will be obvious that the member 17 may be readily adjusted and clamped into vertical position or at an angle with respect to the supporting arms 1 irrespective of the angle of the supporting arm 7, hence facilitating the adjustment of a camera upon the bracket. It will be understood that by this arrangement, when a camera is screwed upon the stud, the arm may be adjusted to raise or lower the supporting arms 1 in order to adjust the lens of a camera into proper alinement with the object or view to be taken.

What I claim is:—

1. An adjustable bracket, comprising supporting arms having their outer ends bent inwardly and pointed, and their opposite ends bent inwardly and formed with tongues, a link having kerfs to receive said tongues and pivotally connected thereto, a supporting arm carried by and pivotally connected to said link, a spring connecting said supporting arms, a post carried by said supporting arm having a threaded extension at one end for the purpose specified, and a clamping thumb screw fitted in its opposite end.

2. An adjustable bracket, comprising supporting arms having their outer ends bent inwardly and pointed, and their opposite ends bent inwardly and formed with reduced sections or tongues, rubber sleeves carried by said supporting arms, a link having kerfs to receive said reduced sections or tongues and pivotally connected thereto, and having a depending slotted lug, a supporting arm pivoted at one end in the slot of said lug and having its opposite end pointed, a spring connecting said supporting arms, a post carried by said supporting arm having a threaded extension at one end for the purpose specified, and a clamping thumb screw fitted in its opposite end.

In testimony whereof I have hereunto set my hand this 29th day of August, A. D. 1916.

WILLIAM H. WATROUS.

Witnesses:
M. E. HITCHCOCK,
M. D. BLONDEL.